US010590628B2

(12) United States Patent
Ariga et al.

(10) Patent No.: US 10,590,628 B2
(45) Date of Patent: Mar. 17, 2020

(54) WORK MACHINE (71) Applicant: HITACHI CONSTRUCTION MACHINERY CO., LTD., Tokyo (JP)

(72) Inventors: Nobuei Ariga, Tsuchiura (JP); Hiroyuki Kamata, Koganei (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/082,411

(22) PCT Filed: Jul. 28, 2017

(86) PCT No.: PCT/JP2017/027522
§ 371 (c)(1),
(2) Date: Sep. 5, 2018

(87) PCT Pub. No.: WO2018/061454
PCT Pub. Date: Apr. 5, 2018

(65) Prior Publication Data
US 2019/0112791 A1 Apr. 18, 2019

(30) Foreign Application Priority Data
Sep. 28, 2016 (JP) ................ 2016-190290

(51) Int. Cl.
*E02F 9/24* (2006.01)
*E02F 9/26* (2006.01)

(52) U.S. Cl.
CPC ............ *E02F 9/24* (2013.01); *E02F 9/26* (2013.01); *E02F 9/261* (2013.01); *E02F 9/267* (2013.01);
(Continued)

(58) Field of Classification Search
None
See application file for complete search history.

(56) References Cited

U.S. PATENT DOCUMENTS

2010/0171829 A1* 7/2010 Yago ............... G07C 5/0858
348/143
2010/0250060 A1* 9/2010 Maeda ............ G07C 5/0858
701/33.4
(Continued)

FOREIGN PATENT DOCUMENTS

EP   2 624 552 A1   8/2013
EP   2 631 374 A1   8/2013
(Continued)

OTHER PUBLICATIONS

International Preliminary Report on Patentability received in corresponding International Application No. PCT/JP2017/027522 dated Apr. 11, 2019.
(Continued)

*Primary Examiner* — Shelley Chen
(74) *Attorney, Agent, or Firm* — Mattingly & Malur, PC (57) ABSTRACT

Provided are a plurality of cameras (96) mounted to an upper swing structure (12) so as to be capable of shooting in different directions, a video storage device (99) for storing videos taken by the plurality of cameras, a controller (40), and a hydraulic excavator (1). The controller has a camera selection section (40a) which when a lower track structure (11), the upper swing structure (12), or a work device (1A) makes an operation, selects a camera in accordance with the operation from among the plurality of cameras (96), and a storage control section (40b) which stores videos taken by the camera selected by the camera selection section (40a) during the operation of the lower track structure, the upper swing structure, or the work device in a video storage device (99).

9 Claims, 8 Drawing Sheets

(52) U.S. Cl.
CPC ... *B60R 2300/105* (2013.01); *B60Y 2200/412* (2013.01)

(56) References Cited

U.S. PATENT DOCUMENTS

| | | | | |
|---|---|---|---|---|
| 2011/0161140 A1* | 6/2011 | Polt | ............................ | B60R 1/12 |
| | | | | 705/13 |
| 2014/0002651 A1* | 1/2014 | Plante | ...................... | H04N 5/76 |
| | | | | 348/148 |
| 2014/0300739 A1* | 10/2014 | Mimar | ................... | H04N 7/188 |
| | | | | 348/148 |
| 2015/0002674 A1* | 1/2015 | Kleve | ....................... | H04N 7/18 |
| | | | | 348/149 |
| 2015/0070497 A1* | 3/2015 | Lin | ....................... | H04N 1/2129 |
| | | | | 348/148 |
| 2015/0326748 A1* | 11/2015 | Tisch | ......................... | G06T 7/20 |
| | | | | 348/231.4 |
| 2016/0249012 A1* | 8/2016 | Wang | ...................... | H04N 7/0127 |
| 2017/0337753 A1* | 11/2017 | Joodaki | ................. | G07C 5/0841 |

FOREIGN PATENT DOCUMENTS

| | | | | |
|---|---|---|---|---|
| EP | 2 711 471 A1 | | 3/2014 | |
| JP | 08-074296 A | | 3/1996 | |
| JP | 2007-128308 A | | 5/2007 | |
| JP | 2008225735 A | * | 9/2008 | |
| JP | 2009087014 A | * | 4/2009 | ........... G07C 5/0891 |
| JP | 2009-202689 A | | 9/2009 | |
| JP | 2009-227076 A | | 10/2009 | |
| JP | 2010-059653 A | | 3/2010 | |
| JP | 2011171798 A | * | 9/2011 | |
| JP | 2014-78071 A | | 5/2014 | |
| JP | 2015-063864 A | | 4/2015 | |
| JP | 2016-149628 A | | 8/2016 | |

OTHER PUBLICATIONS

International Search Report of PCT/JP2017/027522 dated Oct. 17, 2017.
Notification Concerning Documents Transmitted received in corresponding International Application No. PCT/JP2017/027522 dated Nov. 21, 2018.
Korean Office Action received in corresponding Korean Application No. 10-2018-7024174 dated Sep. 26, 2019.
Extended European Search Report received in corresponding European Application No. 17855412.7 dated Aug. 26, 2019.

* cited by examiner

WORK MACHINE

TECHNICAL FIELD

The present invention relates to a work machine capable of storing peripheral images.

BACKGROUND ART

In the field of automobiles or the like, a video taken by a drive recorder is sometimes used for the analysis of the cause of an accident, accountability and the like. In a drive recorder, the situation inside and outside a vehicle is photographed by a forward shooting camera and a backward shooting camera. In the case where an acceleration not less than a reference value (that is, the shock on the vehicle at the time of generation of an accident) is detected by an acceleration sensor, the video of the forward shooting camera and the backward shooting camera of a predetermined period of time (which is approximately 10 to 100 seconds) stored in a RAM is written to non-volatile memory (see, for example, JP-2016-149628-A).

PRIOR ART DOCUMENT

Patent Document

Patent Document 1: JP-2016-149628-A

SUMMARY OF THE INVENTION

Problem to be Solved by the Invention

Also in work machines including a hydraulic excavator, there is a need for the investigation at the time of an accident by a video recorded in a drive recorder. Due to its nature, however, a work machine is often subject to a shock during normal operation which is greater than the shock of an accident such as contact, and it is difficult to distinguish a shock during normal operation from a shock at the time of an accident by the above method using an acceleration sensor. That is, it is not easy to apply the drive recorder used in an automobile or the like to a work machine.

To solve this problem, it might be possible to constantly record a video taken by a camera in a storage device (non-volatile memory such as flash memory). It should be noted, however, that due to its large machine body size as compared with that of an automobile, the number of cameras used to take the peripheral videos tends to increase, so that the total data amount of the videos is likely to increase. That is, when the capacity of the storage device is the same, the recording-possible time for a work machine tends to be shorter than that for an automobile. Further, in work machines, an accident often occurs between machines of the same management subject. Unlike the data of the drive recorder of an automobile, which is quickly referred to at the time of occurrence of the accident, the data of a work machine is often left unchecked for a considerable length of time. When the video at the time of occurrence of the accident is left unchecked, there remains no free space in the storage device, and the video is overwritten with a new video, which means there is a fear of the video at the time of occurrence of the accident being lost. In this way, the work machine is rather unsuitable for constant recording. If possible, it is desirable to solely record a desired video, thus suppressing as much as possible an increase in the data amount of the storage device.

The present invention has been made in view of the above problem. It is an object of the present invention to provide a work machine capable of recording a video allowing proper grasping of a peripheral situation at the time of the occurrence of an accident.

Means for Solving the Problem

The present application includes a plurality of means for solving the above problem, an example of which is a work machine equipped with a track structure capable of traveling, a swing structure mounted on the track structure and capable of swinging to right and left, and a work device mounted to the swing structure, the work machine including: a plurality of cameras mounted to the swing structure so as to be capable of shooting in different directions; a storage device for storing videos taken by the plurality of cameras; and a controller having a camera selection section that when the track structure, the swing structure or the work device makes an operation, selects from among the plurality of cameras a camera in accordance with the operation, and a storage control section storing in the storage device a video taken during the operation by the camera selected by the camera selection section.

Effect of the Invention

According to the present invention, there is selected a video of a camera in accordance with an operation of the work machine, so that it is possible to properly grasp the peripheral situation of the work machine at the time of occurrence of an accident.

MODES FOR CARRYING OUT THE INVENTION

In the following, an embodiment of the present invention will be described with reference to the drawings. While in the following there is described a hydraulic excavator equipped with a bucket 10 as a forward end attachment of the work device, the present invention may be applied to a hydraulic excavator equipped with an attachment other than a bucket.

In the following description, in the case where there are a plurality of same components, an alphabetical letter may be added to the reference numeral (number). In some cases, however, the alphabetical letter is omitted, and the plurality of components may be collectively expressed. For example, when there are three pumps 300a, 300b, and 300c, they may be collectively expressed as the pumps 300.

[Structure of the Hydraulic Excavator 1]

Figure 1:
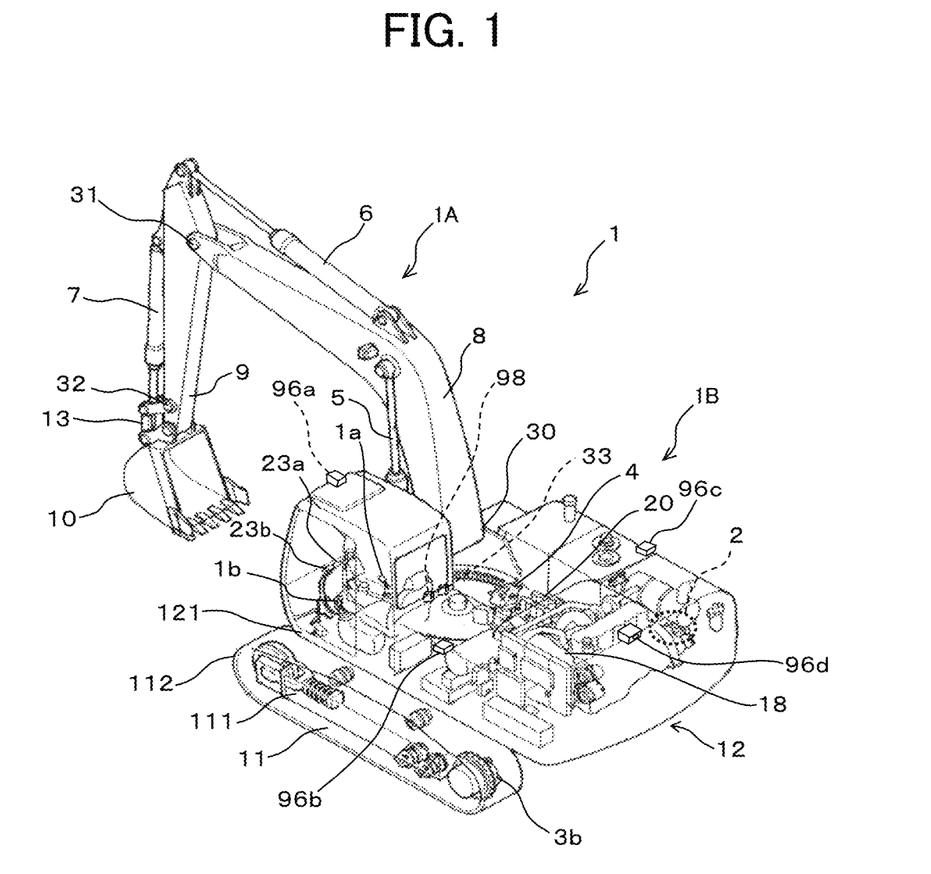
FIG. 1 is a diagram illustrating the structure of a hydraulic excavator according to an embodiment of the present invention.
Figure 2:
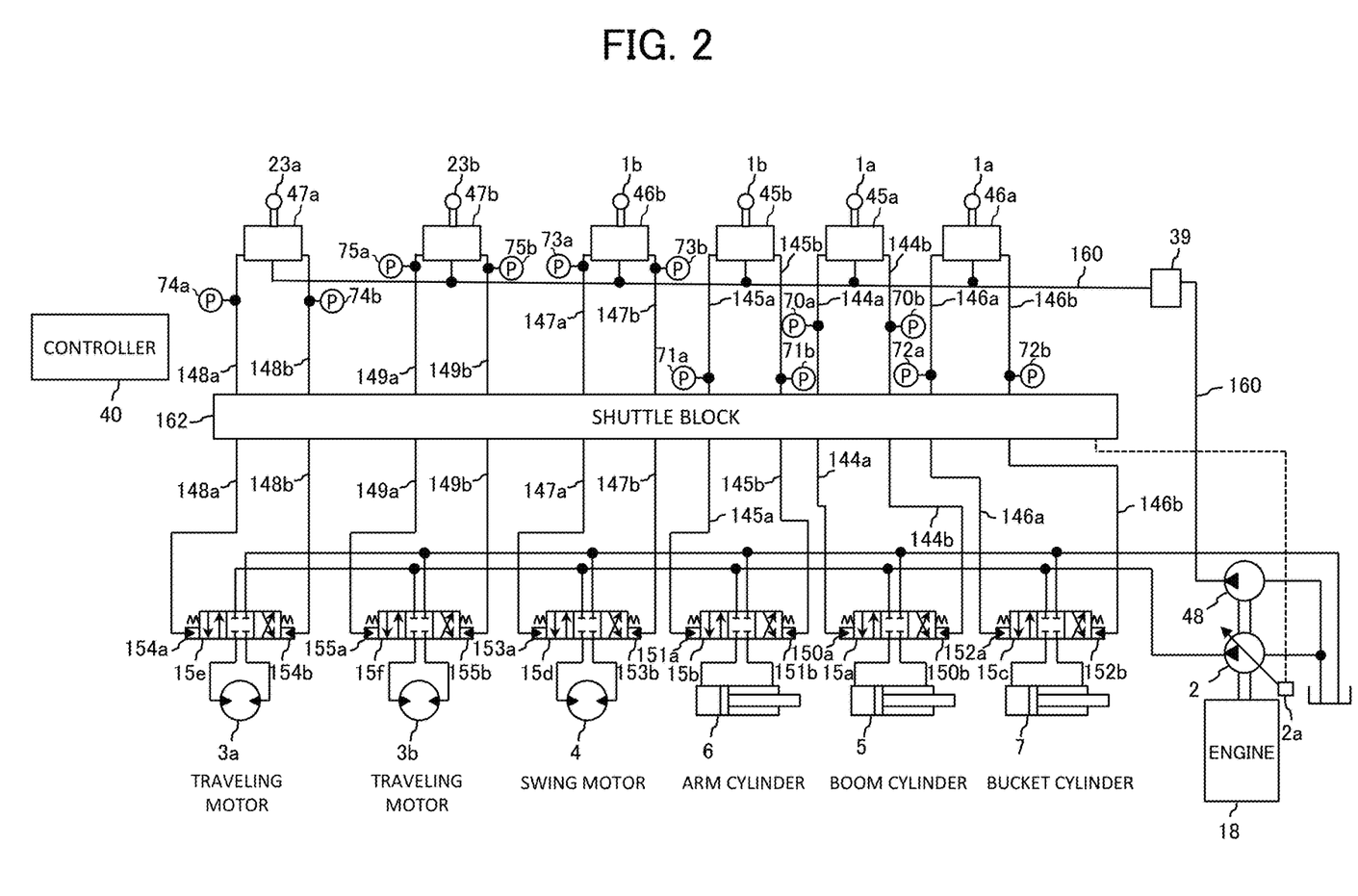
FIG. 2 is a diagram illustrating a controller of the hydraulic excavator of FIG. 1 along with a hydraulic drive system.

FIG. 1 is a diagram illustrating the structure of a hydraulic excavator according to an embodiment of the present invention, and FIG. 2 is a diagram illustrating a controller of the hydraulic excavator of an embodiment of the present invention along with a hydraulic drive system.

In FIG. 1, a hydraulic excavator 1 is equipped with a lower track structure 11 capable of traveling in the front-rear direction, an upper swing structure 12 mounted on top of the lower track structure 11 and capable of swinging to the right and left, a multi-joint type front work device 1A mounted to the front side of the upper swing structure 12, a controller 40 which is a computer, four monocular cameras 96a, 96b, 96c, and 96d each capable of taking videos in different directions, and a video storage device 99 for storing a video taken by the camera 96. In the following, the lower track structure 11 and the upper swing structure 12 may be referred to as a machine body 1B.

In the lower track structure 11, right and left traveling hydraulic motors 3a and 3b accommodated in a track frame 111 are driven to run right and left crawlers 112, whereby the crawlers 112 run in the advancing direction or the retreating direction. When the right and left traveling hydraulic motors 3a and 3b are rotated in the same direction, the lower track structure 11 advances or retreats (Here, the advancing direction and the retreating direction respectively correspond to one and the other side of the front-rear direction of the track frame). In the case where one of the right and left traveling hydraulic motors 3a and 3b is stopped and the other is rotated, and in the case where the right and left traveling hydraulic motors 3a and 3b are rotated in different direction, the lower track structure 11 turns.

The upper swing structure 12 is connected to the lower track structure 11 via a swing bearing (not shown) mounted to the track frame 111, and a pinion gear (not shown) in mesh with a gear formed in the inner peripheral surface of the swing bearing is driven by a swing hydraulic motor 4 mounted on the swing frame 121, whereby the upper swing structure 12 can turn by 360 degrees both to the right and left with respect to the lower track structure 11.

The front work device 1A is formed by connecting together a plurality of driven members (a boom 8, an arm 9, and a bucket 10) each rotating in the vertical direction, and the proximal end of the boom 8 is rotatably supported by the swing frame 121. The arm 9 is rotatably mounted to the distal end portion of the boom 8, and the bucket 10 is rotatably mounted to the distal end portion of the arm 9 via a bucket link 13. The boom 8, the arm 9, and the bucket 10 are respectively driven by a boom cylinder 5, an arm cylinder 6, and a bucket cylinder 7.

A boom angle sensor 30, an arm angle sensor 31, and a boom angle sensor 32 are respectively mounted to a boom pin connecting the boom 8 and the swing frame 121, an arm bin connecting the arm 9 and the boom 8, and a bucket link connecting the bucket 10 and the arm 9. The boom angle sensor 30, the arm angle sensor 31, and the boom angle sensor 32 respectively detect the rotational angles α, β, and γ (see FIG. 5) of the boom 8, the arm 9, and the bucket 10. Further, mounted to the upper swing structure 12 is a machine body inclination angle sensor 33 detecting an inclination angle θ (see FIG. 5) in the front-rear direction of the upper swing structure 12 (machine body 1B) with respect to the reference surface (horizontal surface, for example).

In the cab situated on the front left side of the upper swing structure 12, there are installed an operation device 47a having a traveling right lever 23a, an operation device 47b having a traveling left lever 23b, operation devices 45a and 46a sharing an operation right lever 1a, and operation devices 45b and 46b sharing an operation left lever 1b.

The operation devices 45, 46, and 47 are of the hydraulic pilot type, and, based on the hydraulic fluid delivered from the pilot pump 48, each generate pilot pressures (sometimes referred to as the operation pressures) in accordance with the operation amounts (e.g., lever strokes) and the operational directions of the traveling right lever 23a, the traveling left lever 23b, the operation right lever 1a, and the operation left lever 1b. The pilot pressures thus generated are supplied to hydraulic drive sections 150a through 155b of corresponding flow control valves 15a through 15f (see FIG. 2) in a control valve unit 20 via pilot lines 144a through 149b (see FIG. 2), and are used as control signals driving these flow control valves 15a through 15f.

Pressure sensors 70a, 70b, 71a, 71b, 72a, 72b, 73a, 73b, 74a, 74b, 75a, and 75b are respectively mounted to the pilot lines 144A, 144b, 145a, 145b, 146a, 146b, 147a, 147b, 148a, 148b, 149a, and 149b. The pressure sensors 70a through 75b respectively detect the pilot pressures of the pilot lines 144a through 149b as the operation amounts of the operation levers 1a, 1b, 23a, and 23b, and output the detection values to the controller 40.

An engine 18 which is a prime mover mounted in the upper swing structure 12 drives a hydraulic pump 2 and a pilot pump 48. The hydraulic pump 2 is a variable displacement hydraulic pump the displacement of which is controlled by a regulator 2a, and the pilot pump 48 is a fixed displacement hydraulic pump. In the present embodiment, a shuttle block 162 is provided at some midpoint of the pilot lines 144, 145, 146, 147, 148, and 149. Hydraulic signals output from the operation devices 45, 46, and 47 are also input to the regulator 2a via the shuttle block 162. A detailed description of the structure of the shuttle block 162 will be left out. A hydraulic signal is input to the regulator 2a via the shuttle block 162, and the delivery flow rate of the hydraulic pump 2 is controlled in accordance with the hydraulic signal.

A pump line 160 which is delivery piping of the pilot pump 48 passes through a lock valve 39, and then branch off into a plurality of lines to be connected to the respective valves of the operation devices 45, 46, and 47. In the present example, the lock valve 39 is a solenoid selector valve, and a solenoid drive section thereof is electrically connected to a position sensor of a gate lock lever (not shown) arranged in the cab (FIG. 1). The position of the gate lock lever is detected by the position sensor, and a signal in accordance with the position of the gate lock lever is input from the position sensor to the lock valve 39. When the gate lock lever is at the lock position, the lock valve 39 is closed and the pump line 160 is interrupted, and when it is at the lock releasing position, the lock valve 39 is open, and the pump line 160 is open. That is, in the state in which the pump line 160 is interrupted, the operation by the operation devices 45, 46, and 47 is nullified, and the operation such as swinging and excavation is prohibited.

The hydraulic fluid delivered from the hydraulic pump 2 is supplied to the traveling right hydraulic motor 3a, the traveling left hydraulic motor 3b, the swing hydraulic motor 4, the boom cylinder 5, the arm cylinder 6, and the bucket cylinder 7 via the flow control valves 15a, 15b, 15c, 15d, 15e, and 15f (see FIG. 2). Due to the hydraulic fluid supplied, the boom cylinder 5, the arm cylinder 6, and the bucket cylinder 7 expand and contract, whereby the boom 8, the arm 9, and the bucket 10 rotate, and the claw tip position of the bucket 10 and the posture of the work device 1A are changed. Further, due to the hydraulic fluid supplied, the swing hydraulic motor 4 rotates, whereby the upper swing structure 12 swings with respect to the lower track structure 11. Further, due to the hydraulic fluid supplied, the traveling right hydraulic motor 3a and the traveling left hydraulic motor 3b rotate, whereby the lower track structure 11 travels.

Four cameras (a forward shooting camera 96a, a leftward shooting camera 96b, a rightward shooting camera 96c, and a backward shooting camera 96d) are mounted to a portion near the upper surface outer edge of the upper swing structure 12. It is desirable for the lenses of the cameras 96 to be fisheye lenses.

The forward shooting camera 96a is mounted to the front side outer edge of the upper surface of the cab at an angle of depression, and is capable of shooting an area in front of the upper swing structure 12. The forward shooting camera 96a has a tilting function and is vertically swingable. For that purpose, it is equipped with a drive mechanism 97 (see FIG. 3). The drive mechanism 97 is a motor rotating the forward shooting camera 96a around the tilting axis, and is controlled based on a control signal output from the controller 40 (a drive mechanism control section 40e (see FIG. 4)).

The leftward shooting camera 96b is mounted to the left side outer edge of the upper surface of the upper swing structure 12 at an angle of depression, and is capable of shooting the area on the left-hand side of the upper swing structure 12. The rightward shooting camera 96c is mounted to the right side outer edge of the upper surface of the upper swing structure 12 at an angle of depression, and is capable of shooting the area on the right-hand side of the upper swing structure 12. The backward shooting camera 96b is mounted to the back side outer edge of the upper surface of the upper swing structure 12 at an angle of depression, and is capable of shooting the area on the rear side of the upper swing structure 12.

Figure 8:
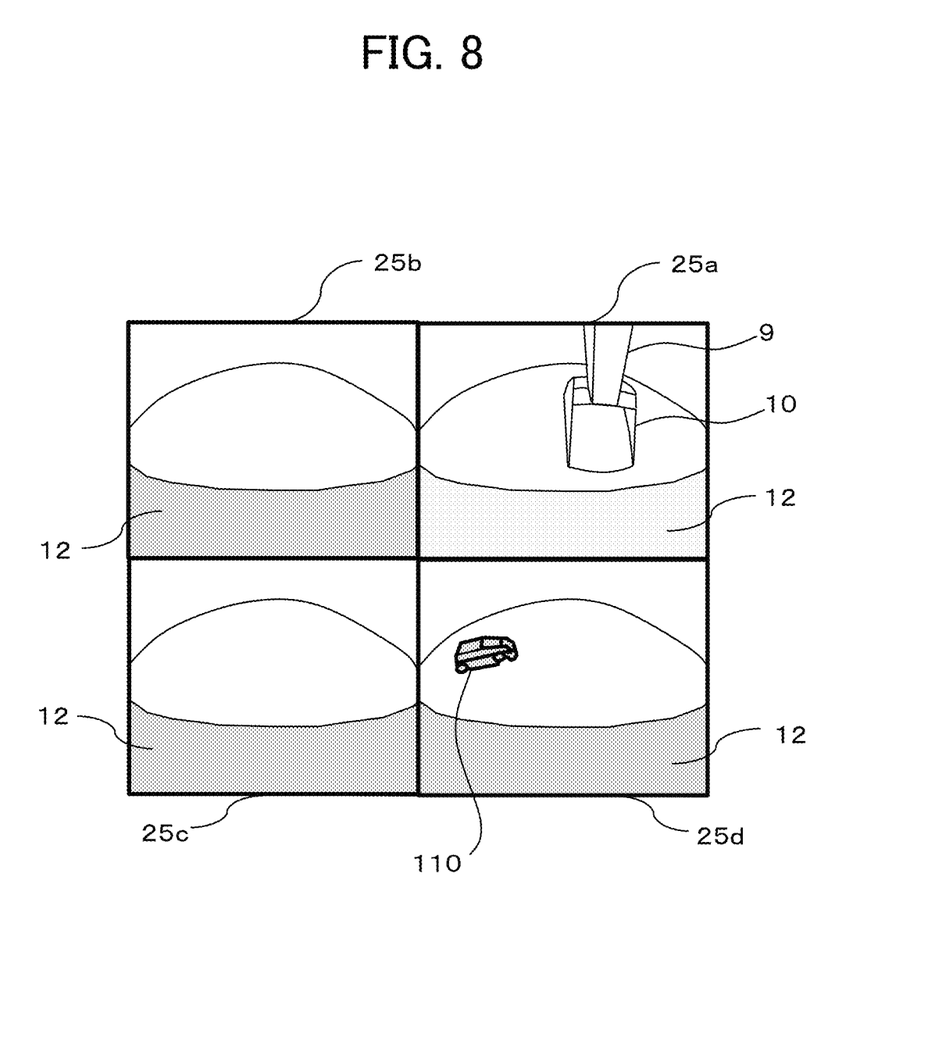
FIG. 8 is a diagram illustrating an example of images taken by four cameras.

FIG. 8 shows an example of images taken by the four cameras 96. FIG. 8 shows an image 25a taken by the forward shooting camera 96a, an image 25b taken by the leftward shooting camera 96b, an image 25c taken by the rightward shooting camera 96c, and an image 25d taken by the backward shooting camera 96d. The bucket 10 and the arm 9 are in the image 25a, and a machine 110 traveling behind the upper swing structure 12 is in the image 25d. The images 25 can be displayed on a display device 53.

A video storage device 99 is an external storage device consisting of non-volatile memory connected to the controller 40. For example, it may be flash-memory. It is not necessary for the video storage device 99 to be an external storage device. It is also possible to utilize a storage device inside the controller 40 (for example, the ROM 93).

Mounted to the upper swing structure 12 is an acceleration sensor 98 for detecting the magnitude of a shock (force) applied to the upper swing structure 12.

Inside the cab of the upper swing structure 12, and at positions not interfering with the field of vision of the operator such as above an operation panel (not shown), there are installed a video shooting ON/OFF switch 17 for switching between permission and prohibition of recording on the video storage device 99 of videos taken by the four cameras 96, and a tilting ON/OFF switch 19 for switching between ON and OFF of a tilting function by which the orientation of the forward shooting camera 96a is in conformity with the position of the claw tip of the bucket 10.

Further, inside the cab and at a position not interfering with the field of vision of the operator, there is installed a display device (monitor) 53 for displaying the videos, etc. taken by the cameras 96.

[Structure of the Controller 40]

Figure 3:
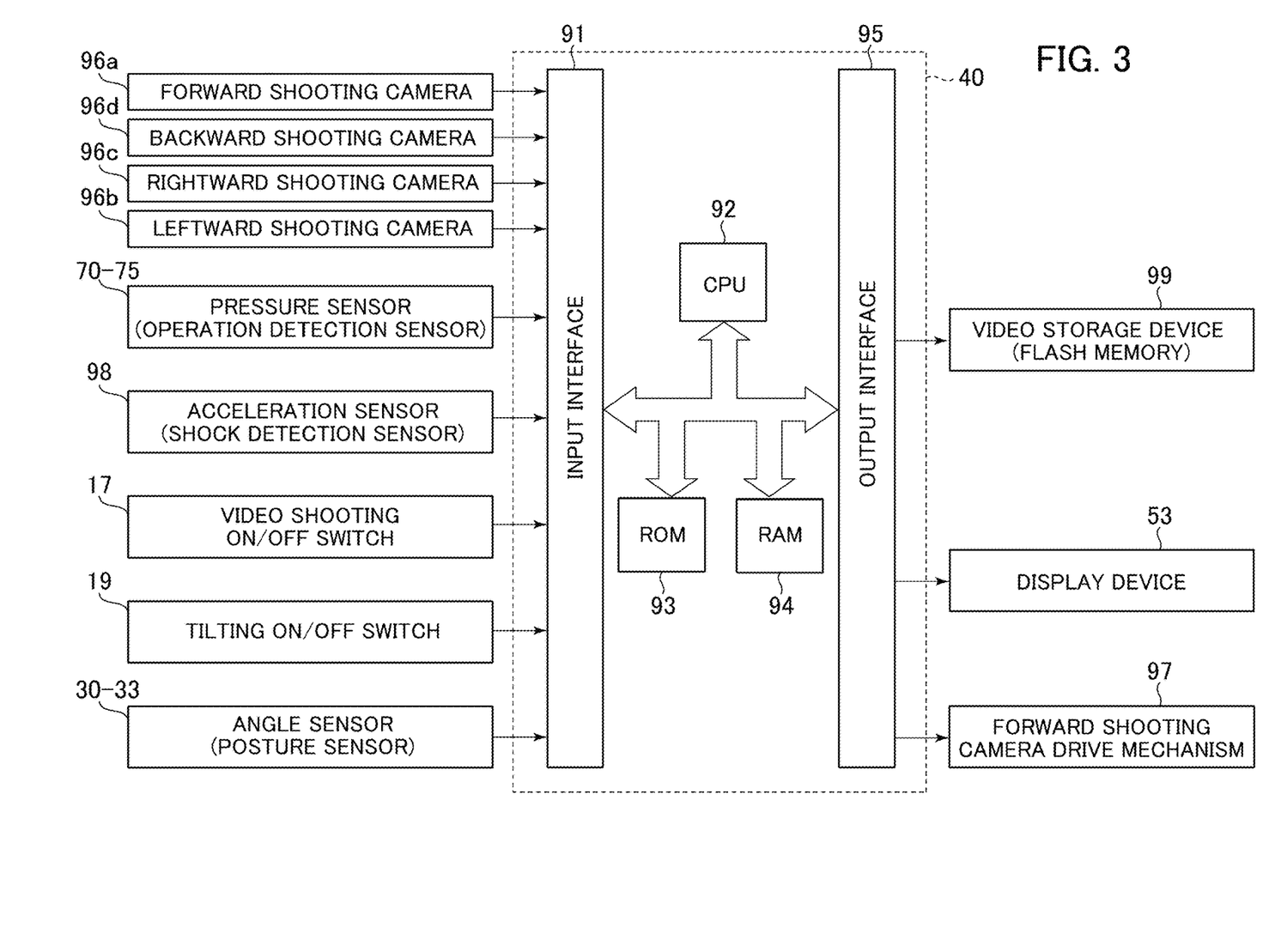
FIG. 3 is a diagram illustrating a hardware structure of the controller of the hydraulic excavator of FIG. 1.

FIG. 3 shows the hardware structure of the controller 40. The controller 40 is a computer having an input section 91, a central processing unit (CPU) 92 which is a processor, a read-only memory (ROM) 93 and a random-access memory (RAM) 94 which are storage devices, and an output section 95.

The input section 91 inputs signals from the angle sensors 30 through 32 and the inclination angle sensor 33 which are posture sensors, signals from the operation shooting ON/OFF switch 17, signals from the pressure sensors 70 through 75 which are operation detection sensors, and a signal from an acceleration sensor 98 which is a shock detection sensor, and transforms into a form allowing utilization by the CPU 92.

The ROM 93 is a storage medium storing a control program for executing various processes including the process according to the flowchart of FIG. 6 described below, and various items of information necessary for executing the processing of the flowchart. The CPU 92 performs predetermined computation processing on the signals taken in from the input section 91 and the memories 93 and 94 in accordance with the control program stored in the ROM 93. The RAM 94 includes video memory (VRAM) as a temporary storage section (FIG. 4) temporarily storing an image taken by the camera 96.

The output section 95 prepares output signals and data in accordance with the computation result of the CPU 92, and outputs the signals and data to a video storage device 99, the display device 53, or a drive mechanism 97 of the forward shooting camera, thereby recording the photographed video of the camera 96 in the video storage device 99, displaying the photographed video of the camera 96 on the display device 53, and driving the drive mechanism 97 of the forward shooting camera.

Further, connected to the controller 40 are the four cameras 96, the twelve pressure sensors 70 through 75, the acceleration sensor 98, the video shooting ON/OFF switch 17, the four angle sensors 30 through 33, the video storage device 99, the display device 53, and the forward shooting camera drive mechanism 97.

While the controller 40 of FIG. 3 is equipped with semiconductor memories, i.e., the ROM 93 and the RAM 94, as the storage devices, they may be replaced some other device so long as it is a storage device. For example, it may be equipped with a magnetic storage device such as a hard disk drive.

Figure 4:
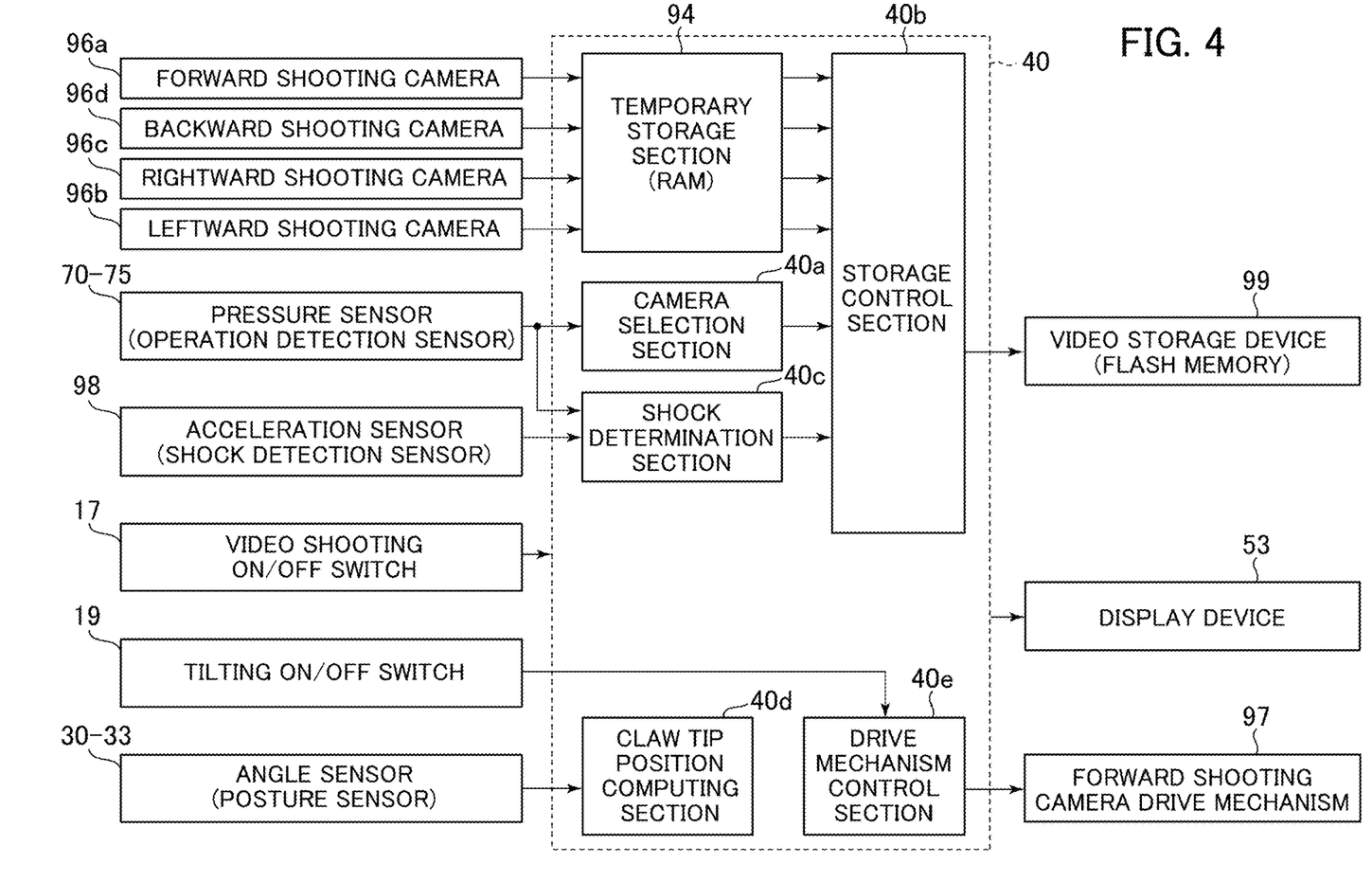
FIG. 4 is a functional block diagram illustrating the controller of the hydraulic excavator of FIG. 1.

FIG. 4 is a functional block diagram illustrating the controller 40 according to an embodiment of the present invention. The controller 40 is equipped with a camera selection section 40a, a storage control section 40b, a shock determination section 40c, a claw tip position computing section 40d, and a drive mechanism control section 40e. While in FIG. 4 the camera selection section 40a, the storage control section 40b, the shock determination section 40c, the claw tip position computing section 40d, and the drive mechanism control section 40e are shown as devices, that is, hardware components, it is also possible to store in the ROM 93 programs capable of executing the functions of these devices, thus realizing the functions of the devices by the programs.

The videos shot by all the cameras 96 are temporarily stored in the temporary storage section 94 by the controller 40. The videos stored here are backdated from the current time by a predetermined period of time (T1). With passage of time, the videos older than T1 are deleted (updated).

When the lower track structure 11, the upper swing structure 12, or the work device 1A operates, the camera selection section 40a selects a camera from which the video is to be recorded in the video storage device 99, from among the four cameras 96 in accordance with the operation. More specifically, based on the operation signals output from the operation devices 45, 46, and 47 (the detection values of the pilot pressures detected by the pressure sensors 70 through 75), the presence/absence of the operation of each of the lower track structure 11, the upper swing structure 12, and the work device 1A is determined, and, based on the determination result, the camera from which the video is to be recorded in the video storage device 99 is selected. The selection processing will be described in detail below with reference to the drawings.

Instead of the selection of the camera, a video may be selected from among the videos taken by the four cameras 96 and stored in the temporary storage section 94. The determination of the presence/absence of the operation by the detection values of the pressure sensors 70 through 75 has only been mentioned by way of example. For example, it is also possible to determine the presence/absence of the operation by the detection value of a position sensor (for example, a rotary encoder) detecting the rotational displacement of the operation lever of each of the operation devices 45, 46, and 47. Further, it is also possible to mount a stroke sensor detecting the expansion/contraction amount of each hydraulic cylinder 5, 6, 7, and to determine the presence/absence of the operation based on the detection values thereof.

The storage control section 40b stores a video stored in the temporary storage section 94 in the video storage section 99. More specifically, shooting is performed during the operation of the lower track structure 11, the upper swing structure 12, or the work device 1A by at least one camera 96 selected by the camera selection section 40a or at least one camera 96 selected when a shock is detected by the shock determination section 40c, and the video temporarily stored in the temporary storage section 94 is stored in the video storage section 99. At the time of recording of the video, the video stored in the temporary storage section 94 (i.e., the video of a recording time T1) may be stored as it is in the video storage section 99, it is also possible to store in the video storage section 99 an extract of a part of the video stored in the temporary storage section 94 (i.e., a video of a recording time shorter than T1).

When, while the lower track structure 11, the upper swing structure 12, and the work device 1A are at rest, the acceleration of the upper swing structure 12 calculated from the detection value of the acceleration sensor 98 exceeds a predetermined threshold value, the shock determination section 40c records the shot videos of all the four cameras 96a, 96b, 96c, and 96d temporarily stored in the temporary storage section 94 in the video storage device 99. Here, that "the lower track structure 11, the upper swing structure 12, and the work device 1A are at rest" can be determined from the detection values of the pressure sensors 70 through 75. The "predetermined threshold value" is set by using as a reference the shock (external force) applied to the upper swing structure 12 at the time of occurrence of an accident. In the case where the acceleration exceeds the threshold value, it is determined that an accident has occurred. For example, the threshold value (a) is set by using as a reference the acceleration generated in the upper swing structure 12 at the time of occurrence of an accident such as collision of another hydraulic excavator with the upper swing structure 12 and the work device A while they are at rest. The threshold value is set so as to be at least larger than the acceleration ($a_0$) generated in the upper swing structure 12 due to the operational vibration of the engine while the upper swing structure 12 and the work device A are at rest ($a > a_0$).

Figure 5:
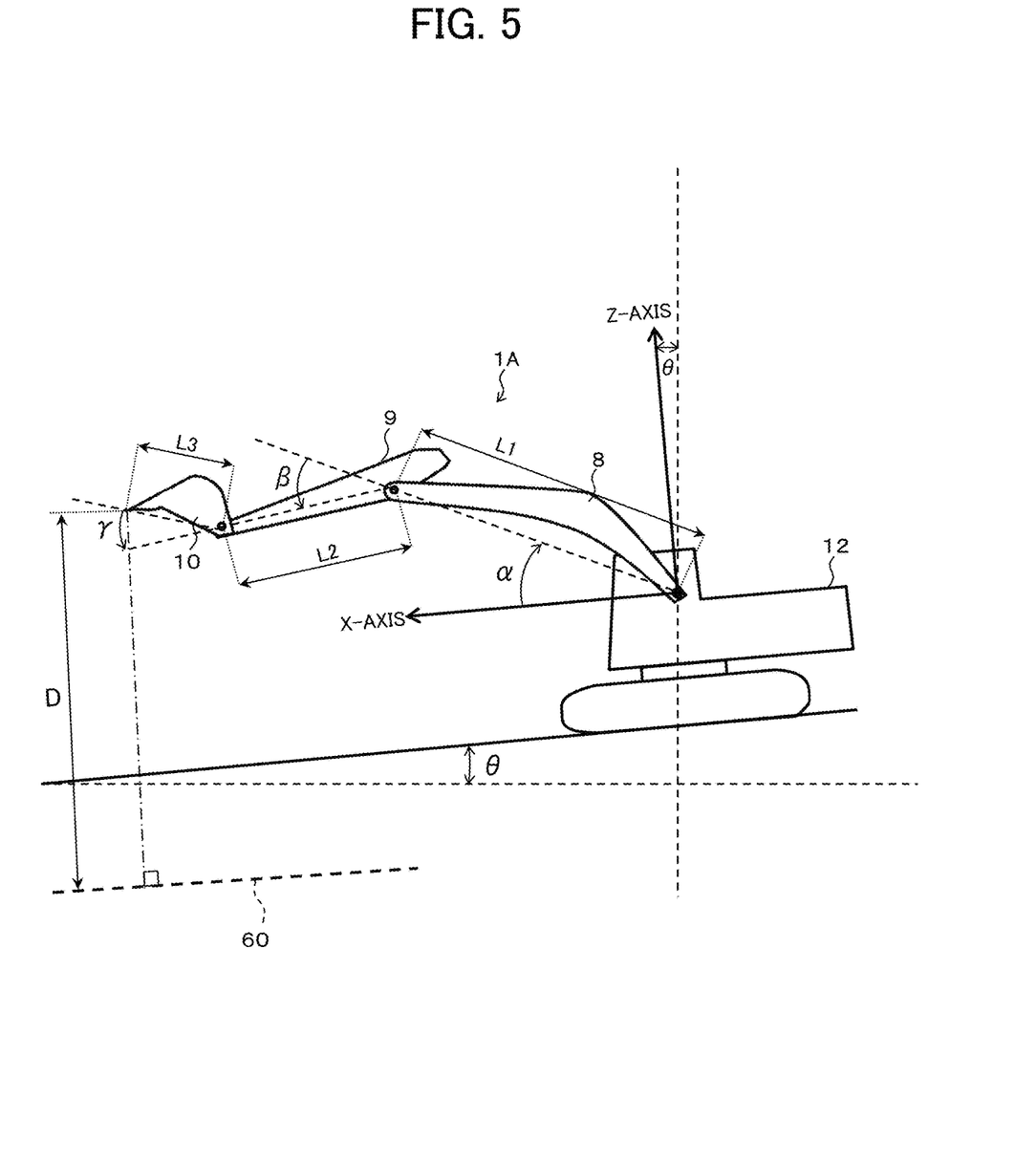
FIG. 5 is a diagram illustrating a coordinate system in the hydraulic excavator of FIG. 1.

Based on the information from the angle sensors 30 through 33, the claw tip position computing section 40d computes the posture of the work device 1A and the position of the claw tip of the bucket 10. The posture of the work device 1A can be defined in the excavator coordinate system of FIG. 5. The excavator coordinate system of FIG. 5 is a coordinate system set on the upper swing structure 12, and has the origin at the proximal portion of the boom 8 rotatably supported by the upper swing structure 12. The Z-axis is set in the vertical direction of the upper swing structure 12, and the X-axis is set in the horizontal direction thereof. The inclination angle of the boom 8 with respect to the X-axis is the boom angle $\alpha$, the inclination angle of the arm 9 with respect to the boom 8 is the arm angle $\beta$, and the inclination angle of the claw tip of the bucket with respect to the arm is the bucket angle $\gamma$. The inclination angle of the machine body 1B (upper swing structure 12) with respect to the reference surface (horizontal surface, for example) is the inclination angle $\theta$. The boom angle $\alpha$ is detected by the boom angle sensor 30, the arm angle $\beta$ is detected by the arm angle sensor 31, the bucket angle $\gamma$ is detected by the bucket angle sensor 32, and the inclination angle $\theta$ is detected by the machine body inclination angle sensor 33. Assuming that, as shown in FIG. 5, the respective lengths of the boom 8, the arm 9, and the bucket 10 are L1, L2, and L3, the coordinates of the bucket claw tip position in the excavator coordinate system and the posture of the work device 1A can be expressed by L1, L2, L3, $\alpha$, $\beta$, and $\gamma$.

In the case where the tilting ON/OFF switch 19 is ON, based on the coordinates of the bucket claw tip calculated by the claw tip position computing section 40d and the coordinates of the forward shooting camera 96a, the drive mechanism control section 40e outputs a control signal driving the drive mechanism 97 such that the bucket claw tip is situated at the central position in the vertical direction of the image taken by the forward shooting camera 96a. The drive mechanism 97 rotates the forward shooting camera 96a based on the control signal input from the drive mechanism control section 40e. As a result, the tilting angle of the forward shooting camera 96a is varied such that the bucket claw tip is constantly situated at the central portion of the image taken by the forward shooting camera 96a. Here, there has been described the case where the bucket claw tip is constantly situated at the central portion of the image taken by the forward shooting camera 96a. In the case, however, where the claw tip does not move to the exterior of the image taken by the forward shooting camera 96a, the control can be changed as appropriate within the range in which the bucket claw tip is included in the image taken. For example, the variation of the tilting angle may be interrupted.

In the case where the tilting ON/OFF switch 19 is OFF, the drive mechanism control section 40e maintains the tilting angle of the forward shooting camera 96a at a set value, and stops the driving of the drive mechanism 97. As the set value of the tilting angle, it is desirable to set an angle of depression as in the case of the other cameras 96b, 96c, and 96d. It is also possible, however, to change the value in accordance with the work.

[Specific Processing Executed by the Controller 40]

Next, the processing executed by the controller 40 according to the present embodiment will be described in detail with reference to FIGS. 6 and 7. FIG. 6 is a flowchart illustrating camera video storage processing executed by the controller 40 of the present embodiment. The controller 40 executes the flowchart of FIG. 6 at a predetermined control cycle.

First, in S100, the controller 40 determines whether or not the video shooting ON/OFF switch 17 is ON. When it is ON, the procedure advances to S110, and when it is OFF, the procedure is kept on standby until the next control cycle.

In S110, the camera selection section 40a inputs the detection values of the pressure sensors 70 through 75, and determines whether or not there has been an operation input from the operator with respect to the operation levers 1a, 1b, 23a, and 23b. This determination can be made based on whether or not the detection pressures detected by the pressure sensors 70 through 75 exceed a threshold value. As the threshold value, it is possible to use the minimum value of the pilot pressures generated in the pilot lines 144 through 149 at the time of operation of the operation levers 1a, 1b, 23a, and 23b. Thus, in the case where the detection pressures of none of the pressure sensors 70 through 75 exceed the threshold value, it is determined that there has been "no operation" by the operation levers 1a, 1b, 23a, and 23b, and procedure advances to S240. If there exists even one pressure sensor the detection value of which exceeds the threshold value, it is determined that there has been an "operation" by the operation levers, and the procedure advances to S120.

In S120, the camera selection section 40a determines whether or not the lower track structure 11 is operating, that is, whether or not the lever operation detected in S110 is that with respect to the traveling motors 3a and 3b of the lower track structure 11. More specifically, it is determined whether or not the detection pressure of one of the four pressure sensors 74a, 74b, 75a, and 75b exceeds a threshold value. Here, in the case where the detection pressure of one of the four pressure sensors 74a, 74b, 75a, and 75b exceeds the threshold value, it is determined that the lower track structure 11 is operating, and the procedure advances to S130. On the other hand, in the case where the detection pressure of none of the four pressure sensors 74a, 74b, 75a, and 75b exceeds the threshold value, the upper swing structure 12 or the work device 1A is the operation object, so that the procedure advances to S140.

In S130, the camera selection section 40a selects the forward shooting camera 96a and the backward shooting camera 96d as the cameras from which videos are to be stored in the storage device 99, and the procedure advances to S200.

In S140, the camera selection section 40a determines whether or not the upper swing structure 12 is swinging to the right, that is, whether or not the lever operation detected in S110 is one causing the swing motor 4 of the upper swing structure 12 to rotate to the right. More specifically, it is determined whether or not the detection pressure of the pressure sensor 73a exceeds a threshold value. Here, in the case where the detection pressure of the pressure sensor 73a exceeds the threshold value, it is determined that the upper swing structure 12 is swinging to the right, and the procedure advances to S150. On the other hand, in the case where the detection pressure of the pressure sensor 73a does not exceed the threshold value, the object of operation is the leftward swinging of the upper swing structure 12 or the operation of the work device 1A, so that the procedure advances to S160.

In S150, as the cameras from which videos are to be stored in the storage device 99, the camera selection section 40a selects the forward shooting camera 96a and the rightward shooting camera 96c, and the procedure advances to S200.

In S160, the camera selection section 40a determines whether or not the upper swing structure 12 is swinging to the left, that is, whether or not the lever operation detected in S110 is that for causing the swing motor 4 for the upper swing structure 12 to rotate to the left. More specifically, it is determined whether or not the detection pressure of the pressure sensor 73b exceeds a threshold value. Here, in the case where the detection pressure of the pressure sensor 73b exceeds the threshold value, it is determined that the upper swing structure 12 is swinging to the left, and the procedure advances to S170. On the other hand, in the case where the detection pressure of the pressure sensor 73b does not exceed the threshold value, the object of operation is the work device 1A, so that the procedure advances to S180.

In S170, the camera selection section 40a selects, as the cameras from which videos to be stored in the storage device 99, the forward shooting camera 96a and the leftward shooting camera 96b, and the procedure advances to S200.

In S180, the camera selection section 40a determines that the work device 1A is operating. That is, in this case, the process of elimination applies. The lever operation detected in S110 is with respect to at least one of the boom cylinder 5, the arm cylinder 6, and the bucket cylinder 7 of the work device 1A. More specifically, the detection pressure of one of the six pressure sensors 70a, 70b, 71a, 71b, 72a, and 72b exceeds a threshold value. In this case, it is determined that the work device 1A is operating, and the procedure advances to S190.

In S190, the camera selection section 40a selects the forward shooting camera 96a as the camera from which a video to be stored in the storage device 99, and the procedure advances to S200.

In S200, the storage control section 40b gains from the temporary storage section 94 the videos of the cameras 96 selected in one of the steps S130, S150, S170, and S190, and stores the same in the video storage device 99. In the process, at the storage start into the video storage device 99 (This applies to the case where S200 is reached for the first time at one control cycle, and does not apply to the case where the procedure returns from S210 to S200), the previous storage completion position is retrieved from the video storage device 99, and video data is stored starting from the retrieved storage completion position.

In S210, the camera selection section 40a determines whether or not there is a change in the operation determination result based on the detection pressures of the pressure sensors 70 through 75 conducted in S120, S140, S160, and S180. More specifically, of the steps S130, S150, S170, and S190, the step actually passed through is identified, and it is determined whether or not the requisite condition for passing through the step is also satisfied at the point in time of S210. For example, in the case where S130 has been passed through, it is determined whether or not the detection pressure of one of the four pressure sensors 74a, 74b, 75a, and 75b exceeds the threshold value. In the case where S150 has been passed through, it is determined whether or not the detection pressure of the pressure sensor 73a exceeds the threshold value. In the case where S170 has been passed through, it is determined whether or not the detection pressure of the pressure sensor 73*b* exceeds the threshold value. In the case where S190 has been passed through, it is determined whether or not the detection pressure of one of the pressure sensors 70*a*, 70*b*, 71*a*, 71*b*, 72*a*, and 72*b* exceeds the threshold value. In the case where, as a result, there is obtained the same operation determination result also at the point in time of S210, it is determined that "there is no change," and the recording of videos is continued in S200. On the other hand, in the case where a different operation determination result is obtained at the point in time of S210 (including the case where the detection pressures of all the pressure sensors 70 through 75 are the threshold value or less), it is determined that "there is a change," and the procedure advances to S220.

In S220, the storage control section 40*b* stops the storage of videos into the video storage device 99, and the procedure advances to S230.

In S230, the storage control section 40*b* saves, as the next video storage start position, the position where the video storage is completed in the video storage device 99 in S220. As mentioned in connection with the description of S200, this position constitutes the next video storage start position. In the present embodiment, in the case where 100% of the capacity of the storage device 99 is exceeded, the continuation is stored starting from 0%. As a result, the chronologically oldest video is overwritten with the newest video. When S230 is completed, the controller 40 is kept on standby until the next control cycle comes around.

On the other hand, in the case where the procedure advances to S240, the shock determination section 40*c* determines whether or not the acceleration of the upper swing structure 12 calculated from the detection value of the acceleration sensor 98 is a predetermined threshold value or more. Here, in the case where the acceleration is the threshold value or more (in the case where a shock is detected), the procedure advances to S250, and in the case where it is less than the threshold value, the controller 40 is kept on standby until the next control cycle comes around.

In S250, the shock determination section 40*c* selects, as the cameras from which videos to be stored in the storage device 99, all the four cameras 96*a*, 96*b*, 96*c*, and 96*d*, and the procedure advances to S260.

In S260, the storage control section 40*b* extracts from the temporary storage section 94 a video of a duration of a predetermined time T3 starting from a point in time attained by going back in time by a predetermined time T2 from the time of detection of the shock in S240, and stores it in the video storage device 99 (T2 and T3 are values not more than T1). As a result, a video starting from the point in time attained by going back in time by T2 from the time of detection of the shock is stored in the storage device 99, so that the investigation of the cause of the shock is facilitated. When S260 is complete, the procedure advances to S230.

Figure 7:
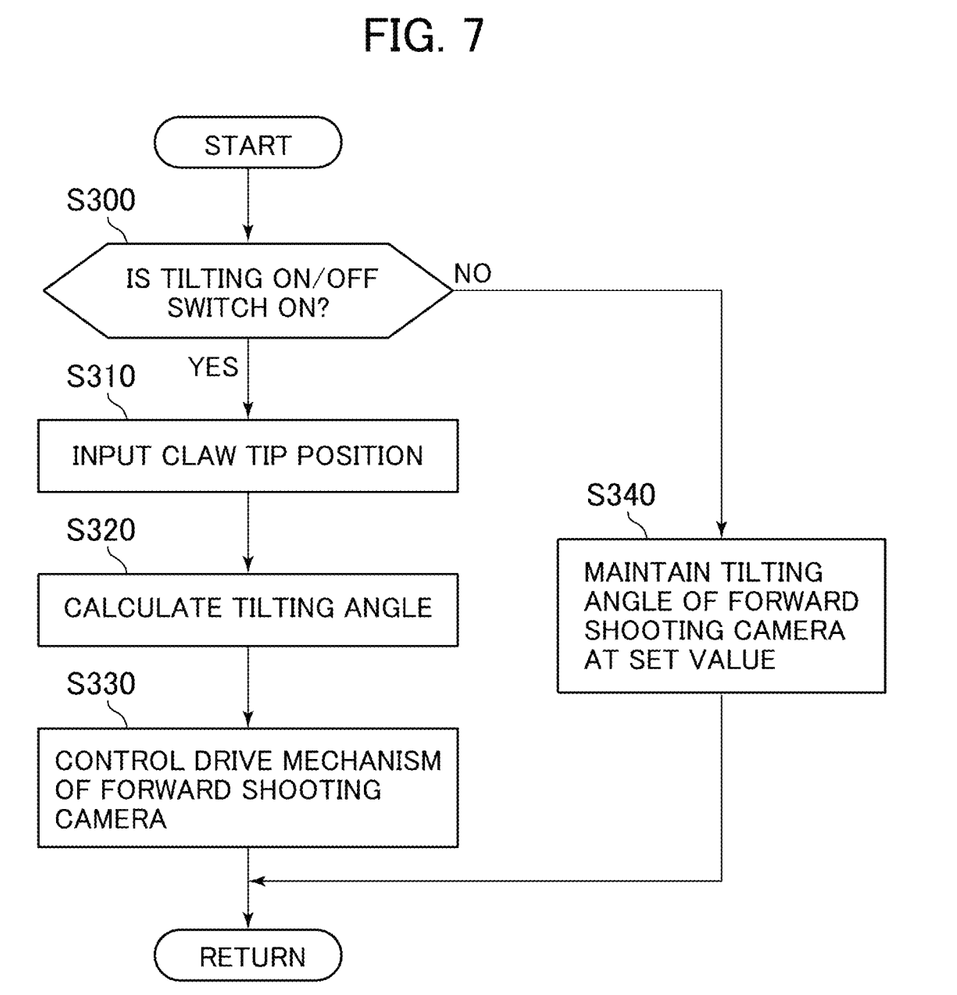
FIG. 7 is a flowchart illustrating control processing for a forward shooting camera drive mechanism executed by the controller of the hydraulic excavator of FIG. 1.

FIG. 7 is a flowchart illustrating the control processing of the drive mechanism 97 of the forward shooting camera 96*a* to be executed by the controller 40 of the present embodiment. The controller 40 (drive mechanism control section 40*e*) executes the flowchart of FIG. 7 at a predetermined control cycle.

In S300, the drive mechanism control section 40*e* determines whether or not the tilting ON/OFF switch 19 is ON. In the case where the switch is ON, the procedure advances to S310, and in the case where the switch is OFF, the procedure advances to S340.

In S310, the drive mechanism control section 40*e* gains the position (coordinates) of the claw tip of the bucket 10 computed by the claw tip position computing section 40*d*.

In S320, the drive mechanism control section 40*e* calculates a tilting angle which causes the bucket claw tip to be situated at the central portion in the vertical direction of the image taken by the forward shooting camera 96*a* based on the coordinates of the bucket claw tip position gained in S310 and the coordinates of the forward shooting camera 96*a*.

In S330, the drive mechanism control section 40*e* outputs a control signal to the drive mechanism 97 such that the forward shooting camera 96*a* is controlled by the tilting angle calculated in S320. The drive mechanism 97 that inputs this control signal controls the tilting angle of the forward shooting camera 96*a* to the value calculated in S320. When S330 is completed, the controller 40 is kept on standby until the next control cycle comes around.

In S340, the drive mechanism control section 40*e* maintains the tilting angle of the forward shooting camera 96*a* at a set value (the value of the angle of depression), and the controller 40 is kept on standby until the next control cycle comes around.

In the case where the tilting ON/OFF switch 19 is ON according to the flowchart of FIG. 7, the forward shooting camera 96*a* is constantly directed toward the bucket claw tip, and the bucket claw tip is included without fail in the image taken. Thus, in the case where the forward shooting camera 96*a* is selected by the camera selection section 40*a* in the flowchart of FIG. 6, it is possible to save a video including the bucket claw tip in the storage device 99.

[Effect of the Invention]

The effects of the hydraulic excavator constructed as described above will be described.

(1) In the above embodiment, there is provided a hydraulic excavator 1 equipped with a lower track structure 11 capable of traveling, an upper swing structure 12 mounted on the lower track structure 11 and capable of swinging to the right and left, and a work device 1A mounted to the upper swing structure 12, the hydraulic excavator 1 including: a plurality of cameras 96 mounted to the upper swing structure 12 so as to be capable of shooting in different directions; a video storage device 99 for storing videos taken by the plurality of cameras 96; a camera selection section 40*a* that when the lower track structure 11, the upper swing structure 12 or the work device 1A makes an operation, selects from among the plurality of cameras 96 a camera in accordance with the operation, and a storage control section 40*b* storing in the video storage device 99 a video taken during the operation of the lower track structure 11, the upper swing structure 12, or the work device 1A by the camera selected by the camera selection section 40*a*.

Due to the above structure of the hydraulic excavator, in the case where the lower track structure 11, the upper swing structure 12, or the work device 1A is operated, a camera suitable for grasping the situation at the time of the operation is selected as appropriate from among the plurality of cameras 96, and the video taken by the selected camera during the operation can be stored in the video storage device 99. Further, due to the selection of the camera for saving the video, it is possible to suppress a reduction in the free space of the storage device 99 as compared with the case where the videos of all the cameras are saved. Further, the saving of the videos is effected only while the lower track structure 11, the upper swing structure 12, and the work device 1A are operating. This also helps to suppress the reduction in the free space of the storage device 99. Thus, if an accident should be generated due to the operation of the lower track structure 11, the upper swing structure 12, and the work device 1A, it is possible to easily refer to the requisite video necessary for the investigation of the accident.

(2) In the above-described embodiment, there are provided the forward shooting camera 96a, the leftward shooting camera 96b, and the rightward shooting camera 96c, and the hydraulic excavator is constructed such that when the upper swing structure 12 swings to the right, the camera selection section 40A selects the forward shooting camera 96a and the rightward shooting camera 96c, and that when the upper swing structure 12 swings to the left, the camera selection section 40A selects the forward shooting camera 96a and the leftward shooting camera 96b.

In an accident at the time of swinging operation, the work device 1A often comes into contact with an obstacle. However, when the hydraulic excavator is constructed as described above, it is possible to store a video around the movement destination (swinging destination) of the work device 1A mounted to the front side of the upper swing structure 12 and a video around the work device 1A. Thus, if an accident should occur, it is possible to check the periphery of the work device 1A and the situation of the movement destination thereof by referring to the video stored.

(3) In the above-described embodiment, there are provided the forward shooting camera 96a and the backward shooting camera 96d, and the hydraulic excavator is constructed such that when the lower track structure 11 travels, the camera selection section 40A selects the forward shooting camera 96a and the backward shooting camera 96d.

In an accident during traveling operation, the hydraulic excavator often comes into contact with an obstacle in the advancing direction thereof. However, when the hydraulic excavator is constructed as described above, it is possible to store videos of the front side and the rear side of the upper swing structure 12, which are the main advancing directions at the time of traveling operation.

Thus, if an accident should be generated, by referring to the video stored, it is possible to check the situation in the advancing direction of the hydraulic excavator 1.

In the above-described embodiment, when the lower track structure 11 travels, the forward shooting camera 96a and the backward shooting camera 96d are selected. However, to more reliably check the peripheral situation around the excavator during traveling, all the four cameras 96 may be selected. Generally speaking, in a hydraulic excavator, the lower track structure 11 tends to operate less as compared with the upper swing structure 12 and the work device 1A. Thus, if the hydraulic excavator is constructed as described above, the possibility of the free space of the storage device 99 being pressed is not high.

(4) In the above-described embodiment, there is provided the forward shooting camera 96a, and the hydraulic excavator is constructed such that when the work device 1A operates, the camera selection section 40A selects the forward shooting camera 96a.

When the hydraulic excavator is thus constructed, there is saved a video taken by the forward shooting camera 96a shooting the periphery of the work device 1A at the time of operation of the work device 1A, so that if an accident should occur, by referring to the video stored, it is possible to check the situation of the periphery of the work device 1A. The video taken by the forward shooting camera 96a also serves as the operation record of the work device 1A.

Thus, the camera proves useful not only when investigating an accident but also when checking the work progress and the finish situation.

(5) In the above embodiment, there is further provided the acceleration sensor 98 mounted to the upper swing structure 12, and when the acceleration of the upper swing structure 12 calculated from the detection value of the acceleration sensor 98 while the lower track structure 11, the upper swing structure 12, and the work device 1A are at rest exceeds a predetermined threshold value, the storage control section 40b stores videos taken by the four cameras 96a, 96b, 96c, and 96d in the video storage device 99.

When the hydraulic excavator is thus constructed, it is possible to save a video even in the case where there occurs an accident in which another work machine or the like collides with one's own hydraulic excavator while the latter is at rest, so that it is possible to easily check the situation at the time of occurrence of the accident by referring to the video.

While in the above embodiment all the four cameras 96 are selected at the time of occurrence of the collision, at least one of the four cameras may be selected. For example, in the case where the collided portion can be estimated from the direction of the acceleration acting on the upper swing structure 12, solely the camera shooting in the direction of the collision portion is selected, whereby it is possible to suppress a reduction in the free space of the storage device 99.

(6) In the above embodiment, there are further provided in the above structure (4) the drive mechanism 97 tilting the forward shooting camera 96a in the vertical direction, and the drive mechanism control section 40e which, when the work device 1A operates, tilts the forward shooting camera 96a in conformity with the position of the bucket claw tip (forward end of the work device 1A).

In the hydraulic excavator thus constructed, in the case where the work device 1A operates, a video of the bucket claw tip and the periphery thereof is always recorded, so that the investigation work when the bucket comes into contact with an obstacle is facilitated.

(7) In the above embodiment, there are further provided the operation devices 45, 46, and 47 outputting operation signals (pilot pressures) controlling the operation of the plurality of actuators 3, 4, 5, 6, and 7 driving the lower track structure 11, the upper swing structure 12, and the work device 1A, and the camera selection section 40a determines the operation of the hydraulic excavator based on the operation signals output from the operation devices 45, 46, and 47.

Due to this structure, it is possible to grasp the execution of an operation slightly earlier than the actual operation start of the hydraulic excavator 1. As a result, the selection of the cameras 96 is expedited, and the recording start of the video is expedited, so that it is possible to heighten the possibility of a video immediately before the occurrence of an accident being shot.

(8) In the above embodiment, in the case where there is no more free space in the video storage device 99, the chronologically oldest video is overwritten with the newest video. This makes it possible to make the saving period of each video uniform.

Figure 6:
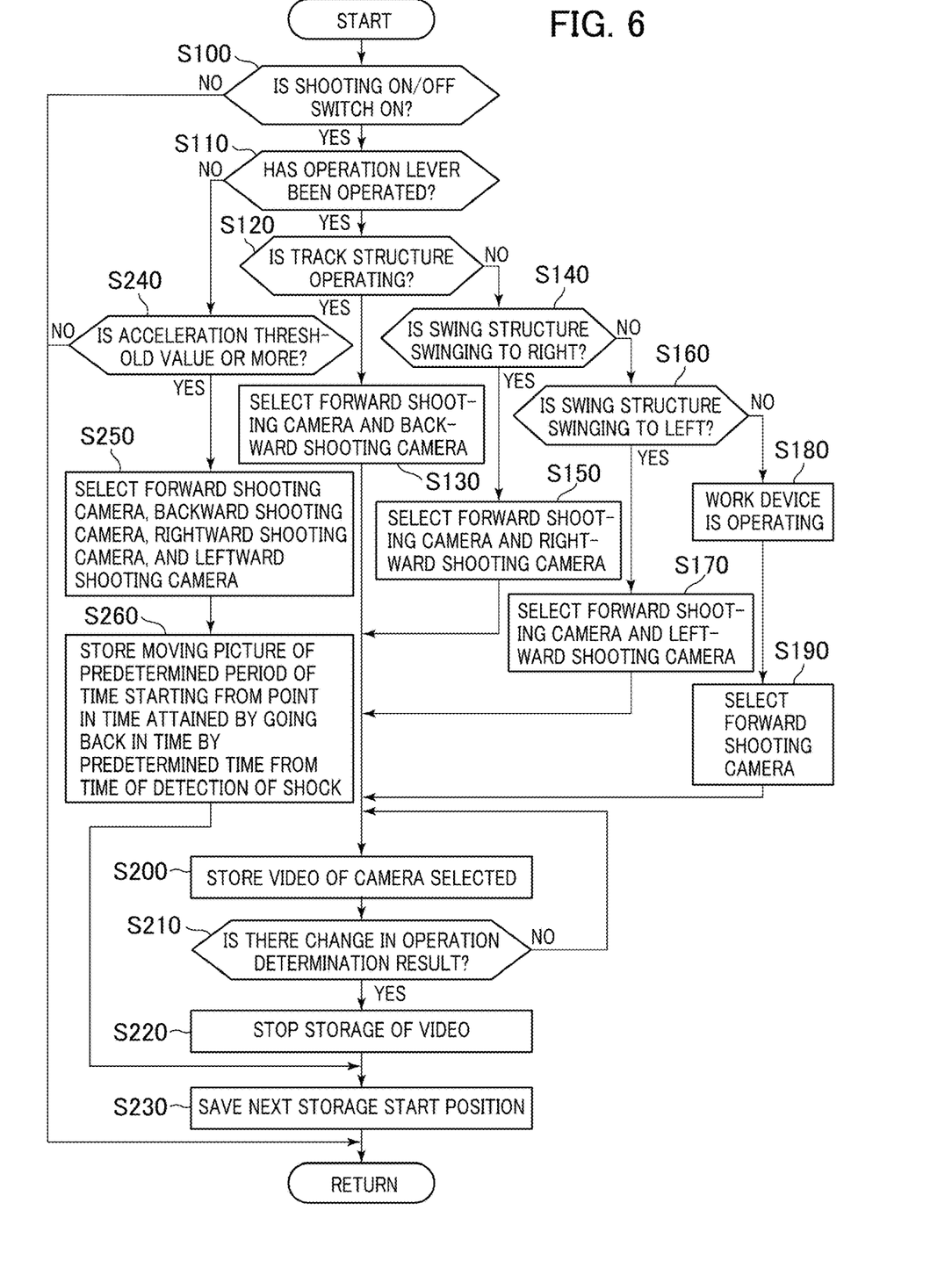
FIG. 6 is a flowchart illustrating camera video storage processing executed by the controller of the hydraulic excavator of FIG. 1.

In another structure, it is determined whether or not there is a free space in the storage device 99 each time the flowchart of FIG. 6 is executed (that is, before executing S100). When there is a free space, the video is saved from the storage start position saved in the previous processing of S230 (that is, the procedure advances to S100). When there is no free space, the storage start position is reset to the initial value (In other words, the free space is regarded as maximum), and the chronologically oldest video is overwritten with the newest video.

(9) In the above embodiment, in the above structure (5), there is further provided the temporary storage section (RAM) 94 in which videos taken by the four cameras 96a, 96b, 96c, and 96d are stored for a predetermined period of time, and the storage control section 40b causes the videos taken by the four cameras which start at the point in time attained by going back in time by a predetermined period of time T2 from the time when the acceleration of the upper swing structure 12 exceeds a predetermined threshold value to be transferred from the temporary storage section 94 to the video storage section 99, thereby storing them in the video storage device 99.

In the hydraulic excavator thus constructed, it is possible to save a video starting at a time earlier than the time of collision, when the acceleration of the upper swing structure 12 exceeds a predetermined threshold value, so that it is possible to easily investigate the situation at the time of collision.

(10) In the above embodiment, there is further provided the switch 17 for switching between permission and prohibition of recording in the video storage device 99 by the plurality of cameras 96a, 96b, 96c, and 96d. As a result, is possible to select between permission and prohibition of shooting of videos as desired by the operator, so that when, for example, the switch 17 is turned OFF quickly after the occurrence of an accident, it is possible to prevent the video at the time of occurrence of the accident from being overwritten with a new video.

[Additional Remarks]

While in the above-described example the cameras 96 mounted to the upper swing structure 12 consist of single-eye cameras, it is also possible to use stereo cameras instead. Further, in the above-described case videos are taken by the cameras 96. There are, however, no particular limitations to the video frame rate. It is possible to go so far as to say that a plurality of still images may be taken. Further, it is possible to add a panning function and a drive mechanism thereof to the forward shooting camera 96a, enabling the camera to perform panning. Further, the mounting positions of the cameras 96 are not restricted to those shown in FIG. 1, but may be changed to other positions so long as they are positions allowing shooting of the necessary regions.

While in the above-described example the excavator is a hydraulic pilot type excavator in which the operation signals output from the operation devices 45, 46, and 47 are hydraulic, the present invention is also applicable to an electric pilot type excavator in which the operation signals are electric signals. Further, the present invention is applicable not only to a work machine having a crawler type lower track structure 11 but also to a work machine having a wheel type track structure.

In carrying out the present invention, it is not necessary to perform the processing exactly in accordance with the flowchart of FIG. 6. Part of the processing may be omitted, and the order of processing may be changed without being a hindrance to the control. For example, regarding the selection of cameras, there are roughly four classifications: (A) S120 and S130, (B) S140, S150, S160, and S170, (C) S180 and S190, and (D) S240 and S250. The hydraulic excavator may be constructed such that at least one of the above is executed. Further, (A) and (B) can be changed in order.

Further, based on the detection values of the angle sensors 30 through 33, the claw tip position computing section 40d may calculate the coordinates of the highest portion of the work device 1A, and the forward shooting camera 96a may be endowed with a tilting function and a panning function, with the forward shooting camera 96a being constantly directed to the highest portion. When, in this structure, the video taken by the forward shooting camera 96a is referred to, if the work device 1A should come into contact with an obstacle above the hydraulic excavator 1, it is possible to easily grasp the situation on that occasion. In this case, it is desirable for the forward shooting camera 96a to be mounted to the upper surface of the cab. Further, a fifth camera may be added to the above four cameras 96, and the highest portion of the work device 1A may be shot by the fifth camera.

Regarding the controller 40, it is also possible to adopt a program (software) which is read and executed by a computation processing device (e.g., a CPU) to thereby realize the functions of the controller. Information related to the program can be stored, for example, in a semiconductor memory (flash memory, SSD or the like), a magnetic storage device (hard disk drive or the like), a storage medium (magnetic disk, optical disk or the like), etc.

DESCRIPTION OF REFERENCE CHARACTERS

1A: Front work device
8: Boom
9: Arm
10: Bucket
17: Video shooting ON/OFF switch
19: Tilting ON/OFF switch
30: Boom angle sensor
31: Arm angle sensor
32: Bucket angle sensor
40: Controller
40a: Camera selection section
40b: Storage control section
40c: Shock determination section
40d: Claw tip position computing section
40e: Drive mechanism control section
45: Operation device (boom, arm)
46: Operation device (bucket, swinging)
47: Operation device (traveling)
70 through 75: Pressure sensor
94: Temporary storage section
96a: Forward shooting camera
96b: Leftward shooting camera
96c: Rightward shooting camera
96d: Backward shooting camera
97: Forward shooting camera drive mechanism
98: Acceleration sensor
99: Video storage device

The invention claimed is:

1. A work machine equipped with:
a track structure capable of traveling,
a swing structure mounted on the track structure and capable of swinging to right and left, and
a work device mounted to the swing structure,
wherein the work machine comprises:
a plurality of cameras mounted to the swing structure so as to be capable of shooting in different directions;
a storage device for storing videos taken by the plurality of cameras; and
a controller having a camera selection section that when the track structure, the swing structure or the work device makes an operation, selects from among the plurality of cameras a camera in accordance with the operation, and a storage control section storing in the storage device a video taken during the operation by the camera selected by the camera selection section; and an acceleration sensor mounted to the swing structure, wherein when an acceleration of the swing structure calculated from a detection value of the acceleration sensor while the track structure, the swing structure, and the work device are at rest exceeds a predetermined threshold value, the storage control section stores videos taken by the plurality of cameras in the storage device.

2. The work machine according to claim 1, wherein:

the plurality of cameras include a forward shooting camera for shooting a front side of the swing structure, a leftward shooting camera for shooting a left side of the swing structure, and a rightward shooting camera for shooting a right side of the swing structure;

when the swing structure swings to right, the camera selection section selects the forward shooting camera and the rightward shooting camera, and when the swing structure swings to left, the camera selection section selects the forward shooting camera and the leftward shooting camera.

3. The work machine according to claim 2, wherein when the work device operates, the camera selection section selects the forward shooting camera.

4. The work machine according to claim 3, further comprising a drive mechanism for tilting the forward shooting camera in a vertical direction, wherein the controller further has a drive mechanism control section that when the work device operates, tilts the forward shooting camera in conformity with a forward end position of the work device.

5. The work machine according to claim 1, wherein the threshold value is set to be larger than an acceleration generated in the swing structure due to an operational vibration of an engine while the swing structure and the work device are at rest.

6. The work machine according to claim 1, wherein:

the controller further has a temporary storage section that stores videos taken by the plurality of cameras for a predetermined period of time; and the storage control section causes videos taken by the plurality of cameras, the videos starting at a point in time attained by going back in time by a predetermined period of time from a time when the acceleration of the swing structure exceeds the predetermined threshold value, to be transferred from the temporary storage section to the storage device, thereby storing the videos in the storage device.

7. The work machine according to claim 1, wherein:

the plurality of cameras include a forward shooting camera for shooting a front side of the swing structure and a backward shooting camera for shooting a back side of the swing structure; and when the track structure travels, the camera selection section selects the forward shooting camera and the backward shooting camera.

8. The work machine according to claim 1, further comprising an operation device for outputting an operation signal controlling operation of each of a plurality of actuators driving the track structure, the swing structure, and the work device, wherein the camera selection section determines an operation of the work machine based on the operation signal output from the operation device.

9. The work machine according to claim 1, further comprising a switch for switching between permission and prohibition of recording of videos taken by the plurality of cameras in the storage device.

* * * * *